US012329315B2

(12) United States Patent
Itzkowitz et al.

(10) Patent No.: US 12,329,315 B2
(45) Date of Patent: Jun. 17, 2025

(54) COOKER FOR GRILL AND AIR FRYER

(71) Applicant: The Steelstone Group LLC, Brooklyn, NY (US)

(72) Inventors: Binyumen Itzkowitz, Brooklyn, NY (US); Meilech Friedman, Brooklyn, NY (US); Joseph Deutsch, Brooklyn, NY (US); Kalman Wertzberger, Brooklyn, NY (US); Robyn De Luca, Queens, NY (US); Wenhui Huang, Brooklyn, NY (US); Naphtali H. Biegeleisen, Brooklyn, NY (US)

(73) Assignee: The Steelstone Group LLC, Brooklyn, NY (US)

( * ) Notice: Subject to any disclaimer, the term of this patent is extended or adjusted under 35 U.S.C. 154(b) by 873 days.

(21) Appl. No.: 17/508,343

(22) Filed: Oct. 22, 2021

(65) Prior Publication Data
US 2022/0125241 A1 Apr. 28, 2022

Related U.S. Application Data

(63) Continuation-in-part of application No. 29/806,447, filed on Sep. 2, 2021, now Pat. No. Des. 1,042,009.

(60) Provisional application No. 63/104,854, filed on Oct. 23, 2020.

(51) Int. Cl.
*A47J 37/06* (2006.01)
*A47J 37/07* (2006.01)

(52) U.S. Cl.
CPC ....... *A47J 37/0641* (2013.01); *A47J 37/0754* (2013.01)

(58) Field of Classification Search
CPC .......................... A47J 37/0641; A47J 37/0754
See application file for complete search history.

(56) References Cited

U.S. PATENT DOCUMENTS

| 4,439,459 | A | * | 3/1984 | Swartley | ............. | A47J 37/1238 |
| | | | | | | 219/400 |
| 4,581,989 | A | * | 4/1986 | Swartley | ............. | A47J 37/0641 |
| | | | | | | 219/400 |
| 5,155,318 | A | * | 10/1992 | Bowen | ..................... | H05B 6/76 |
| | | | | | | 219/757 |

(Continued)

FOREIGN PATENT DOCUMENTS

| CN | 104146623 | 11/2014 |
| CN | 211186911 U | 8/2020 |

(Continued)

OTHER PUBLICATIONS

Notification of transmittal of the International Search Report and the Written Opinion issued by the Federal Institute of Industrial Property in Russia for International Patent Application No. PCT/US2021/056223, mailed Feb. 10, 2022.

(Continued)

*Primary Examiner* — Sean M Michalski
(74) *Attorney, Agent, or Firm* — Myers Wolin, LLC

(57) ABSTRACT

A cooker comprising: an enclosure; a grill plate configured to be situated in the enclosure when the cooker is in a grill configuration; the grill plate being provided with one or more openings; an air fry basket configured to be situated in the enclosure when the cooker is in an air fry configuration; and an air flow generator configured to generate an air flow within the enclosure.

20 Claims, 14 Drawing Sheets

(56) References Cited

U.S. PATENT DOCUMENTS

| | | | | | |
|---|---|---|---|---|---|
| 5,272,302 | A | * | 12/1993 | Dudley | H05B 6/6402 |
| | | | | | 219/744 |
| 5,313,877 | A | * | 5/1994 | Holland | A47J 37/0704 |
| | | | | | 126/41 R |
| 5,534,681 | A | * | 7/1996 | Hwang | H05B 6/6482 |
| | | | | | 219/404 |
| 5,676,870 | A | * | 10/1997 | Wassman | F24C 15/325 |
| | | | | | 219/393 |
| 5,682,811 | A | * | 11/1997 | Kidushim | A47J 37/067 |
| | | | | | 99/450 |
| 8,006,685 | B2 | * | 8/2011 | Bolton | A21B 1/245 |
| | | | | | 219/400 |
| 9,677,772 | B2 | * | 6/2017 | Siegel | F24C 15/2021 |
| 10,390,656 | B2 | * | 8/2019 | Gill | A47J 37/0629 |
| 10,485,377 | B2 | * | 11/2019 | Glucksman | F24C 7/046 |
| 11,033,146 | B2 | * | 6/2021 | Anthony | A47J 37/0664 |
| 11,045,047 | B2 | * | 6/2021 | Popeil | F24C 15/08 |
| 11,339,971 | B2 | * | 5/2022 | Liu | A47J 36/32 |
| 11,585,536 | B2 | * | 2/2023 | Murad | F24C 15/023 |
| 11,937,736 | B2 | * | 3/2024 | Steiner | A47J 37/0676 |
| 2005/0223906 | A1 | * | 10/2005 | Xu | A47J 27/004 |
| | | | | | 99/348 |
| 2006/0042475 | A1 | * | 3/2006 | Craig | A47J 37/0786 |
| | | | | | 99/467 |
| 2006/0131297 | A1 | | 6/2006 | Kim et al. | |
| 2008/0099008 | A1 | * | 5/2008 | Bolton | A21B 1/245 |
| | | | | | 126/21 A |
| 2008/0213447 | A1 | * | 9/2008 | Payen | A47J 37/0641 |
| | | | | | 219/385 |
| 2010/0089248 | A1 | * | 4/2010 | Jones | A47J 37/0641 |
| | | | | | 99/444 |
| 2012/0192726 | A1 | * | 8/2012 | Clearman | A47J 37/0754 |
| | | | | | 99/447 |
| 2013/0008427 | A1 | * | 1/2013 | Ahmed | A47J 37/0704 |
| | | | | | 126/39 B |
| 2013/0206015 | A1 | * | 8/2013 | Jacoby | A47J 37/07 |
| | | | | | 99/330 |
| 2013/0298781 | A1 | * | 11/2013 | Ganuza | A47J 37/0623 |
| | | | | | 99/447 |
| 2014/0216271 | A1 | * | 8/2014 | Arling | A47J 37/041 |
| | | | | | 99/421 H |
| 2014/0230662 | A1 | * | 8/2014 | Siegel | F24C 15/2021 |
| | | | | | 99/344 |
| 2014/0318388 | A1 | * | 10/2014 | Kim | A47J 37/0641 |
| | | | | | 99/447 |
| 2014/0360386 | A1 | * | 12/2014 | Cursoux | A47J 37/0786 |
| | | | | | 99/446 |
| 2015/0012122 | A1 | * | 1/2015 | Minvielle | G01N 33/02 |
| | | | | | 700/90 |
| 2016/0206139 | A1 | * | 7/2016 | Johnson | A47J 37/0641 |
| 2016/0255995 | A1 | * | 9/2016 | Mirzaei | A23L 5/15 |
| 2016/0309956 | A1 | * | 10/2016 | Glucksman | A47J 37/047 |
| 2017/0251874 | A1 | * | 9/2017 | Sladecek | A47J 37/0641 |
| 2018/0035698 | A1 | * | 2/2018 | McNerney | A23L 5/17 |
| 2018/0125293 | A1 | * | 5/2018 | McNerney | A47J 37/0641 |
| 2020/0093329 | A1 | | 3/2020 | Glucksman | |
| 2022/0381445 | A1 | * | 12/2022 | Brown | A23L 5/15 |
| 2023/0132192 | A1 | * | 4/2023 | Gilmartin | A47J 36/32 |
| | | | | | 426/523 |

FOREIGN PATENT DOCUMENTS

| | | |
|---|---|---|
| CN | 211212750 U | 8/2020 |
| KR | 20050111499 A | 11/2005 |
| RU | 2453258 C1 | 6/2012 |
| WO | 2006/053693 A1 | 5/2006 |
| WO | 2009/127001 A1 | 10/2009 |
| WO | 2011/103621 A1 | 9/2011 |
| WO | 2012/032449 A1 | 3/2012 |
| WO | 2015/028911 A1 | 3/2015 |
| WO | 2020176492 A2 | 9/2020 |

OTHER PUBLICATIONS

European Search Report issued by the European Patent Office for International Application No. 21883974.4-1015/4221549, dated Sep. 26, 2024.

* cited by examiner

COOKER FOR GRILL AND AIR FRYER

CROSS-REFERENCE TO RELATED APPLICATIONS

This application claims the benefit of U.S. Provisional Application No. 63/104,854, filed on Oct. 23, 2020, and is a continuation-in-part of and claims priority to U.S. Design patent application Ser. No. 29/806,447, filed on Sep. 2, 2021, the contents of each which are incorporated herein by reference.

FIELD

This disclosure generally relates to food cooking appliances, and more particularly to a grill and air fryer combination.

BACKGROUND

A lot of people enjoy cooking food on the grill. However, many people do not have a backyard or deck for an outdoor grill. Furthermore, harsh elements like rain, snow and wind often make grilling food outdoors not suitable. Therefore, an indoor grill is a popular countertop cooking appliance among many consumers. Unfortunately, indoor grills often emit a lot of smoke when cooking. Too much indoor smoke poses many problems such as respiratory issues, discoloration of walls and furniture, odors, and even triggering of smoke alarms.

Another countertop cooking appliance, especially popular among health-conscious consumers, is an air fryer. An air fryer is a small countertop convection oven designed to simulate deep frying without submerging the food in oil. A fan circulates hot air at high speed, producing a crisp layer via browning reactions such as the Maillard reaction.

For those who enjoy a variety of cooking techniques and methods, including grilled food and air fried food, sufficient countertop space is needed to accommodate both an indoor grill and an air fryer. If an appliance can perform both the grilling and air frying function, significant countertop space saving can be achieved.

Therefore, there is a need for a hybrid cooker that can easily switch the cooking operation between a grill mode and an air fryer mode.

SUMMARY

One embodiment of the present disclosure provides a cooker. The cooker comprises: an enclosure; a grill plate configured to be situated in the enclosure when the cooker is in a grill configuration; the grill plate being provided with one or more openings; an air fry basket configured to be situated in the enclosure when the cooker is in an air fry configuration; and an air flow generator configured to generate an air flow within the enclosure.

In one embodiment, when the cooker is in the grill configuration: the enclosure includes a grilling chamber above the grill plate and a suction chamber below the grill plate, and the air flow generator is configured to cause air to flow from the grilling chamber into the suction chamber, and from the suction chamber back into the grilling chamber. In one embodiment, when the cooker is in the air fry configuration: the enclosure includes an air frying chamber in the air fry basket and an air heating chamber outside the air fry basket; and the air flow generator is configured to cause air to flow from the air heating chamber into the air frying chamber, and from the air frying chamber back into the air heating chamber.

In one embodiment, the cooker further comprises a heat generator configured to: contact with the grill plate, and be situated below the air fry basket and at a distance with the air fry basket.

In one embodiment, the grill plate includes one or more heat transfer components that envelope the heat generator.

In one embodiment, the heat generator includes one or more elongated heat generating elements. Each of the elongated heat generating elements is enveloped within one of the heat transfer components.

In one embodiment, the air fry basket includes an air fry bottom plate that includes no opening.

In one embodiment, the air fry basket includes an air fry bottom plate that is provided one or more openings. A total area of the one or more openings of the air fry bottom plate is smaller than a total area of the one or more openings of the grill plate.

In one embodiment, the air fry basket includes an air fry bottom plate that includes a plurality of ridges. Each of the plurality of ridges projects upward.

In one embodiment, the cooker further comprises circuitry configured to: operate the air flow generator at a first speed when the cooker is in the grill configuration; and operate the air flow generator at a second speed that is greater than the first speed when the cooker is in the air fry configuration.

In one embodiment, the cooker further comprises a smoke sensor and circuity configured to control an amount of heat generated by the heat generator or a speed of air flow generated by the air flow generator based on an amount of smoke detected.

In one embodiment, the cooker further comprises: a drip tray below the grill plate; and a drip tray cover covering the drip tray.

In one embodiment, the air flow generator is further configured to draw fresh air into the enclosure.

In one embodiment, the enclosure is heat resistant.

In one embodiment, the cooker further comprises one or more air vents in the enclosure. When the cooker is in the air fry configuration, the air flow generator directs airflow horizontally across a segment of the air fry basket.

In one embodiment, the enclosure includes an upper shell and a lower shell. The grill plate is a heat plate configured to be situated between the upper and lower shells. The heat plate includes one or more contact surfaces. The air fry basket includes an insert configured to be situated at a distance above the heat plate, the insert including one or more air flow guiding vents.

In one embodiment, the upper and lower shells are hingedly connected.

In one embodiment, the cooker further comprises a temperature sensor and circuity configured to control an amount of heat generated by the heat plate or a speed of air flow generated by the air flow generator based on the temperature of the air in an air heating chamber in the enclosure.

In one embodiment, the cooker further comprises a base outer shell configured to enclose the lower shell and the air flow generator.

In one embodiment, the cooker further comprises a basket for holding food to be air fried in the insert.

In one embodiment, the upper shell is dome-shaped.

DETAILED DESCRIPTION OF THE PREFERRED EMBODIMENTS

Figure 1:
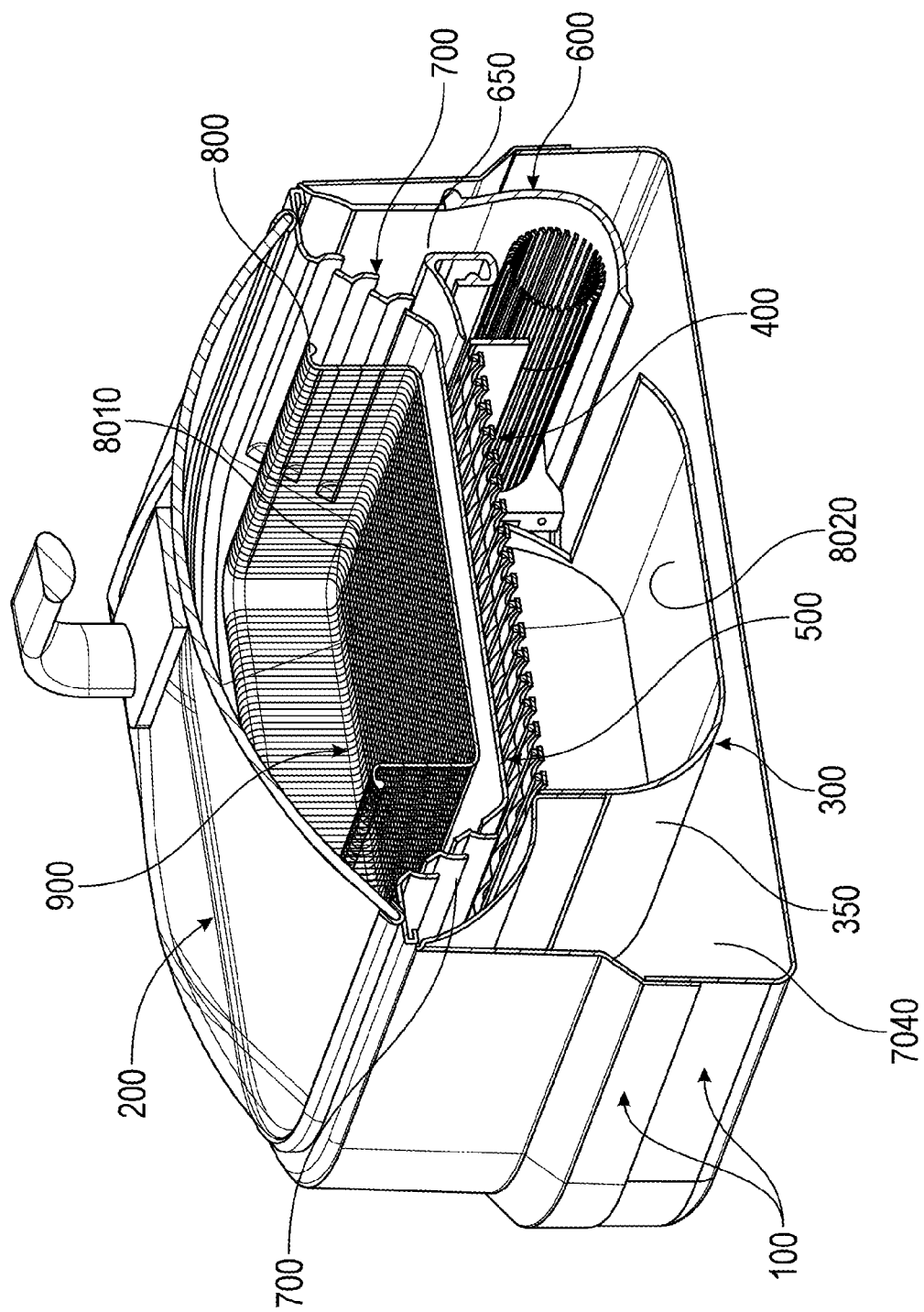
FIG. 1 is a cross-sectional view of a grill and air fryer according to an embodiment.

The description of illustrative embodiments according to principles of the present disclosure is intended to be read in connection with the accompanying drawings, which are to be considered part of the entire written description. In the description of embodiments of the disclosure disclosed herein, any reference to direction or orientation is merely intended for convenience of description and is not intended in any way to limit the scope of the present disclosure. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the disclosure are illustrated by reference to the exemplified embodiments. Accordingly, the disclosure expressly should not be limited to such exemplary embodiments illustrating some possible non-limiting combination of features that may exist alone or in other combinations of features; the scope of the disclosure being defined by the claims appended hereto.

This disclosure describes the best mode or modes of practicing the disclosure as presently contemplated. This description is not intended to be understood in a limiting sense, but provides an example of the disclosure presented solely for illustrative purposes by reference to the accompanying drawings to advise one of ordinary skill in the art of the advantages and construction of the disclosure. In the various views of the drawings, like reference characters designate like or similar parts.

It is important to note that the embodiments disclosed are only examples of the many advantageous uses of the innovative teachings herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality.

FIG. 1 is a cross-section view of a cooker 105 according to an embodiment. As shown, at the outside there is an outer shell 100, forming part of a lower shell, and a lid 200, also referred to herein as an upper shell. Inside the cooker 105, below the lid 200, there is an air fry basket 800, an air fry insert 500 with guiding vents 700, a heating element/plate/grate 400, a heat resistant inner shell 300, and an air flow generator 600, such as a cross-flow fan, pump, etc. Food is to be cooked in the cooking chamber 900, and the inner shell 300 may be heat resistant to support the high temperatures in the cooking chamber.

As such, the lid 200 forms an upper shell and the outer shell 100 and inner shell 300 form a lower shell 350. The upper shell 200 and lower shell 350 form an enclosure, and as shown, the upper shell may be dome shaped. The heat plate 400 is then situated between the upper and lower shells 200, 350, where the heat plate has one or more contact surfaces and one or more openings. For example, the heat plate may form a heating grate 400.

The air fry insert 500, when inserted into the enclosure, is situated at a distance above the heat plate 400. The insert has a plurality of air flow guiding vents 700 as shown.

Figure 7:
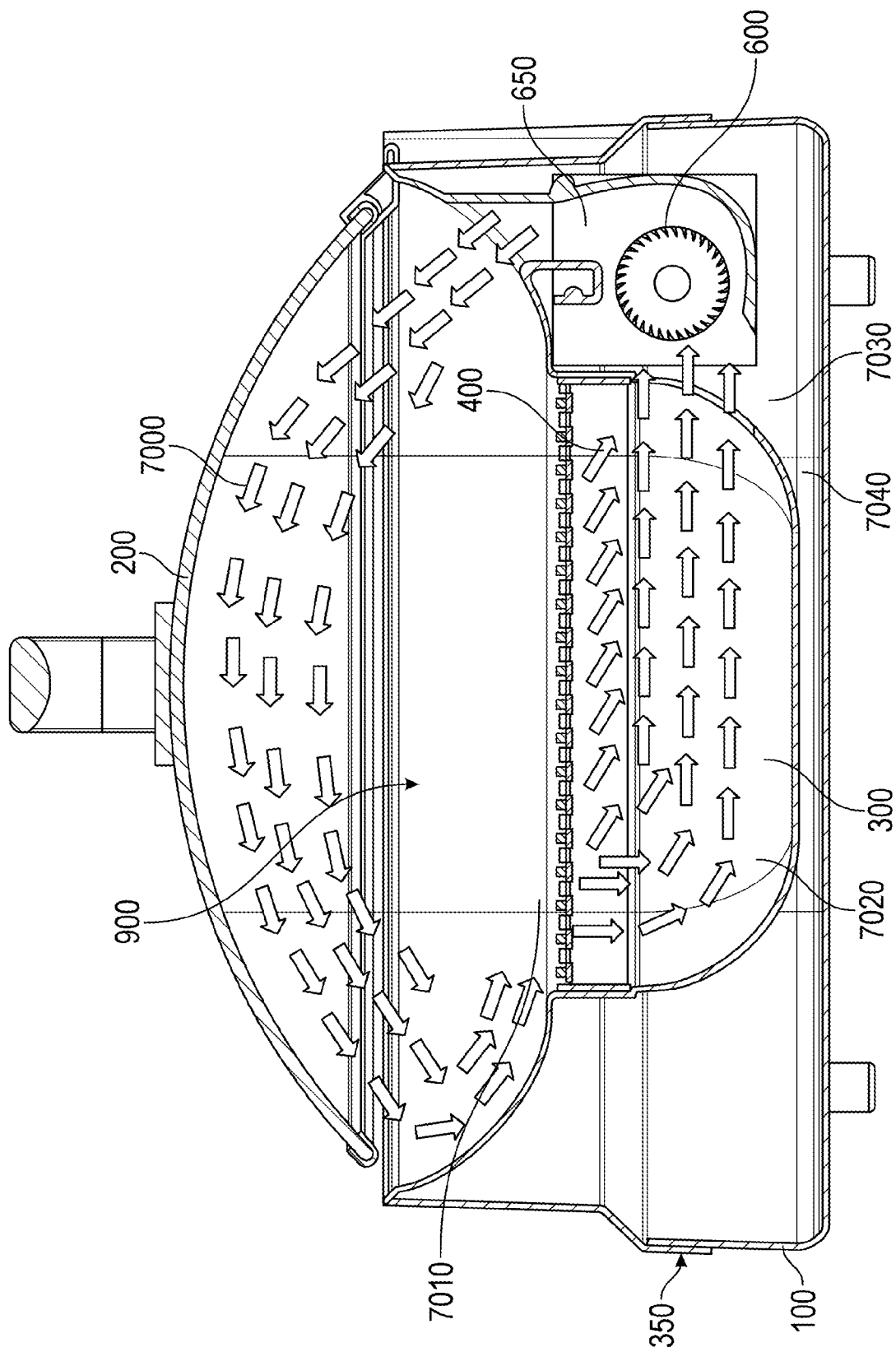
FIG. 7 shows the airflow inside a grill and air fryer when operating in the grill mode according to an embodiment.
Figure 8:
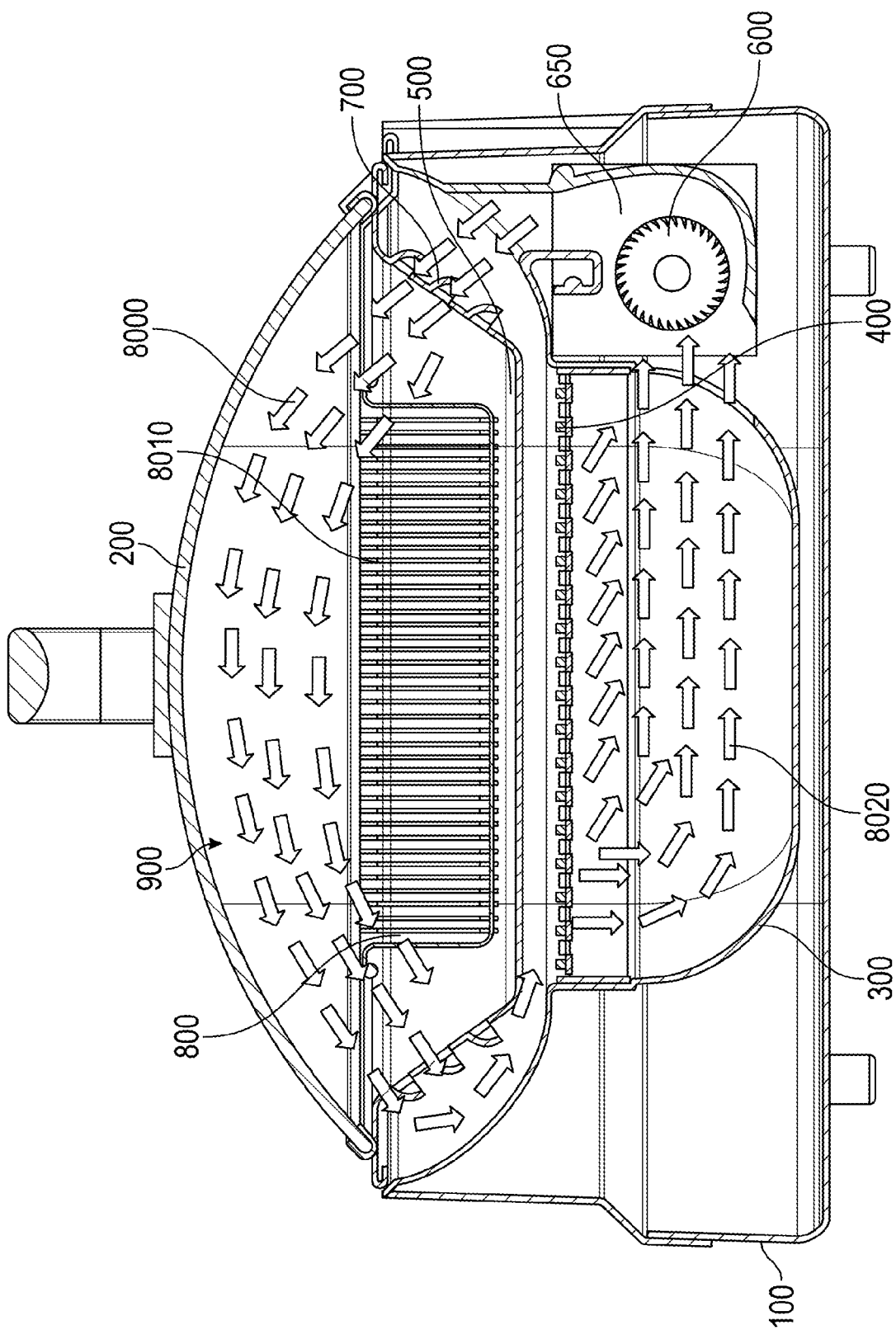
FIG. 8 shows the airflow inside a grill and air fryer when operating in the air fry mode according to an embodiment.

The air flow generator 600 is configured to generate an air flow within the enclosure. Such air flow is shown in FIGS. 7 and 8, and is described in terms of two distinct operating configurations. An air conduit 650 is provided adjacent the air flow generator 600, such that air that is moved by the air flow generator is forced through such a conduit and directed by it.

As discussed in more detail below, the cooker 105 has two distinct operating configurations. In a first configuration, shown in FIG. 6, the insert 500 is detached from the cooker 105, and food may be cooked directly on the heat plate 400. In a second configuration, shown in FIG. 1, the air fry insert 500 is located within the cooker 105, and an air fry basket 800 is located within the air fry insert 500, and food may be cooked within the basket.

Further, the cooker 105 may have a third operating configuration. As shown in FIGS. 7 and 8, the first and second configuration may provide for cooking in the cooker 105 within the enclosure, in the cooking chamber 900. While in the third operating configuration, the lid 200 may be removed. The third operating configuration may otherwise be similar to the first operating configuration, such that the food to be cooked is located directly on the heat plate 400, and airflow is drawn through the heat plate.

Figure 2:
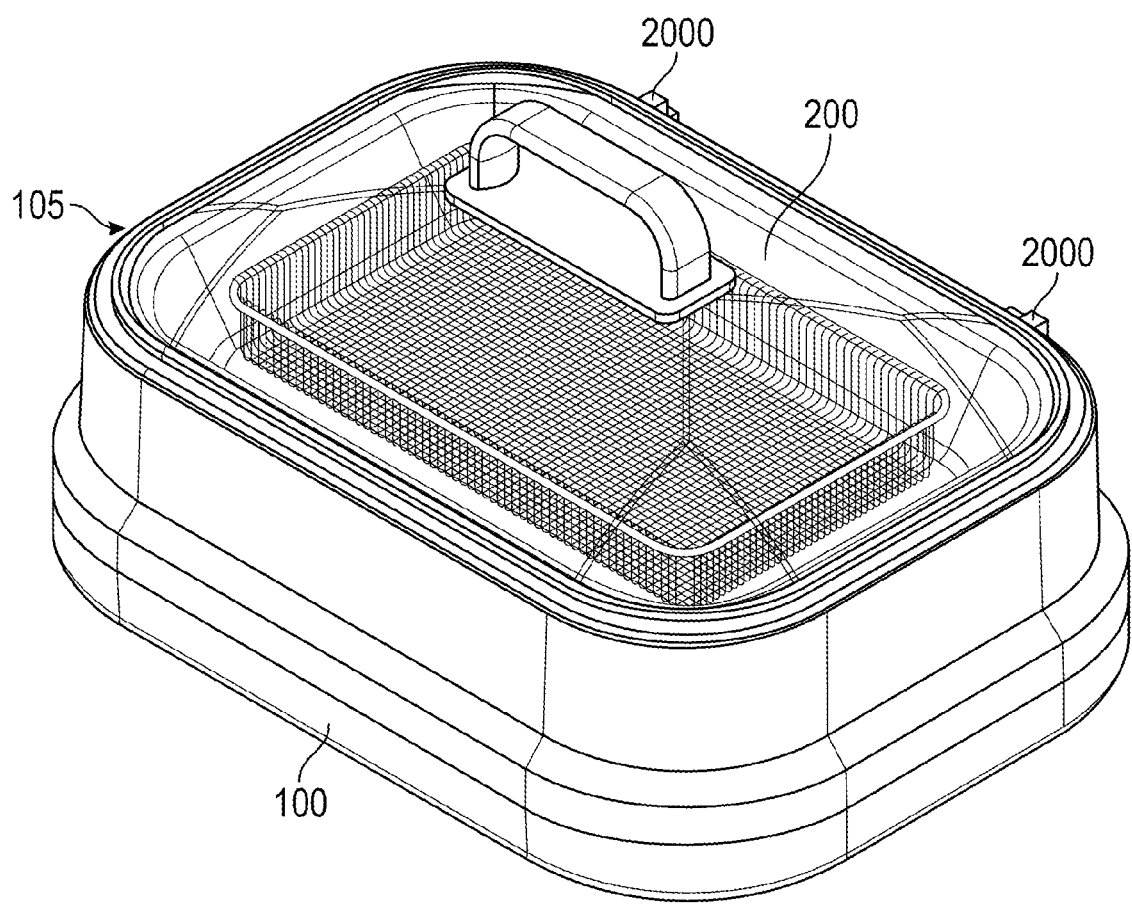
FIG. 2 is a perspective view of a grill and air fryer with the lid closed according to an embodiment.
Figure 3:
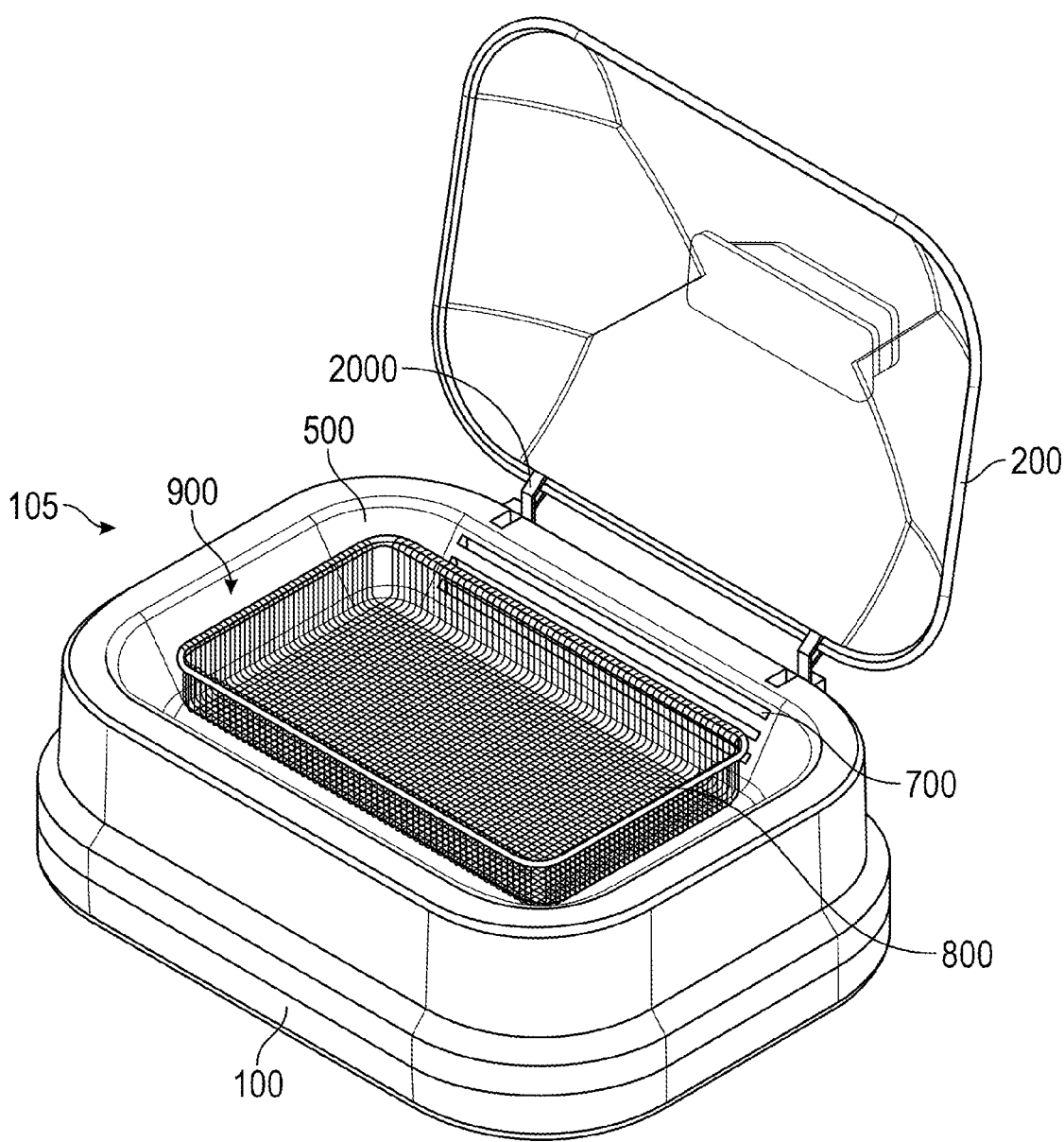
FIG. 3 is a perspective view of a grill and air fryer with the lid opening showing an air fryer insert and a basket according to an embodiment.
Figure 4:
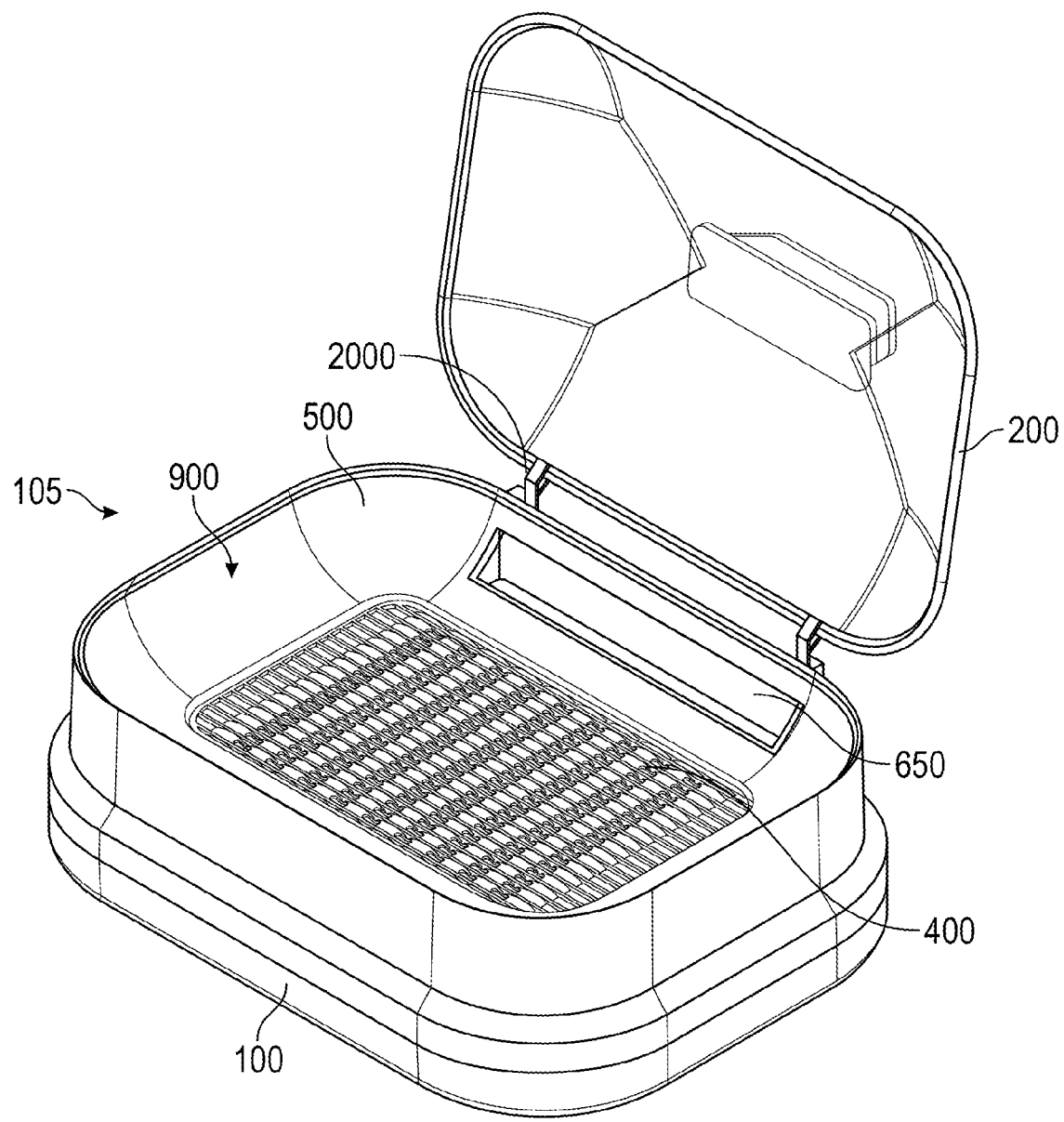
FIG. 4 is a perspective view of a grill and air fryer with the lid opening showing a heating plate according to an embodiment.

FIG. 2 shows the exterior of the cooker 105 when the lid 200 is closed. In FIG. 3, the lid 200 is open, showing the air fry insert 500 and an air fry basket 800 in use when the cooker is operating in the second configuration. As shown, the lid 200 may be hingedly connected to the lower shell 200, 300 by way of hinges 2000. In FIG. 4, the lid 200 is open, the air fry insert 500 and air fry basket 800 are removed, the heating plate 400 is exposed for grilling when the cooker 105 is operating in the smokeless grill mode, referred to elsewhere as the first or third configuration, depending on whether the cooker 105 is closed (in the first configuration) or open (in the third configuration).

Figure 6:
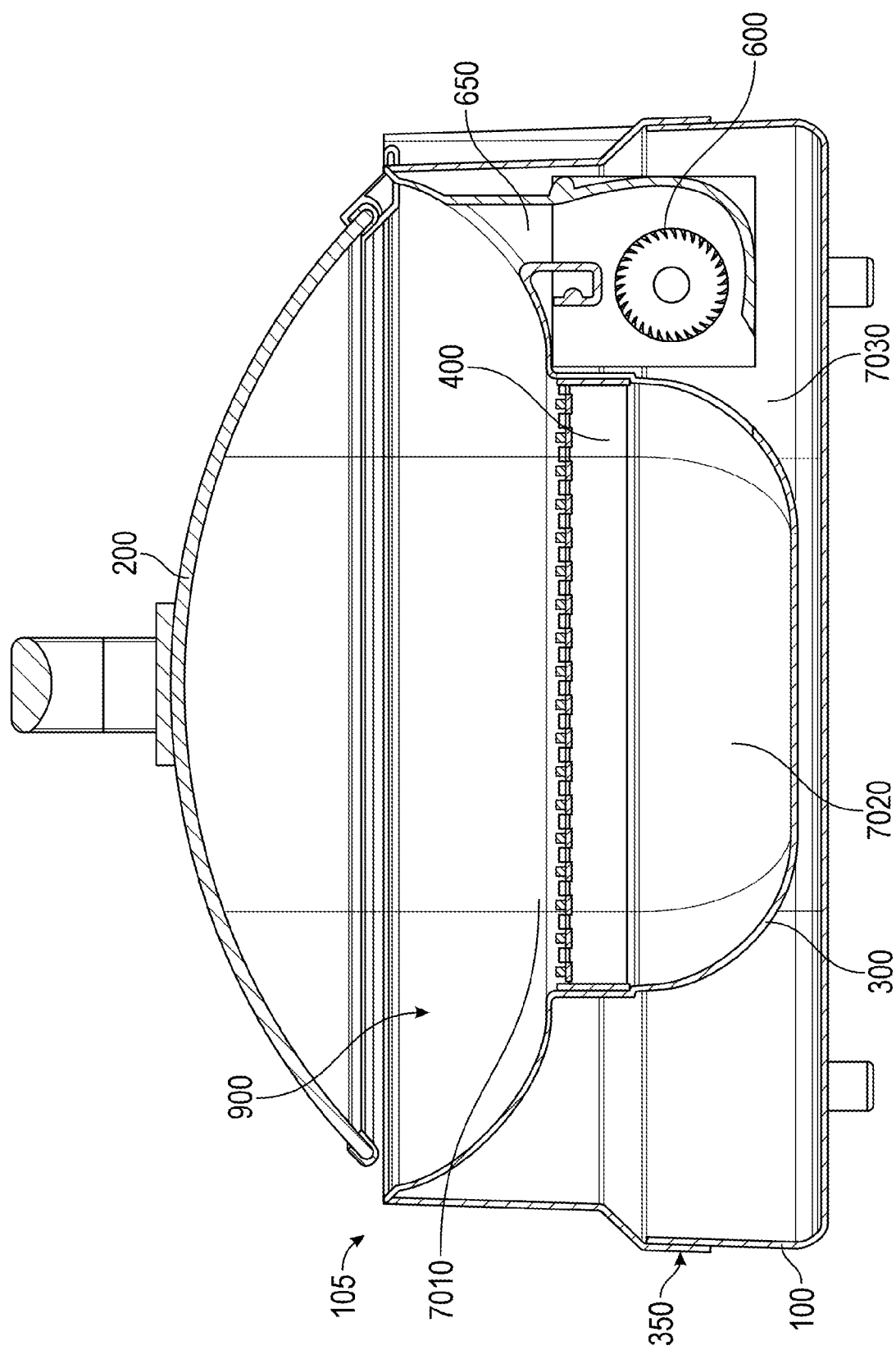
FIG. 6 is a cross-sectional view of a grill and air fryer in the grill mode according to an embodiment.

FIG. 6 shows the first configuration of the cooker 105 for grill mode, and FIG. 7 illustrates air flow 7000 generated by the air flow generator 600 within the enclosure when in the first configuration. In the grill modes, the air fry insert 500 and air fry basket 800 are removed. Food cooked when the cooker 105 is in the first configuration or the third configuration is cooked in a food grilling region 7010 in the space below the lid and directly above the heat plate 400. The air flow 7000 illustrated generates suction in a suction chamber 7020 between the heat plate 400 and inner shell 300. When in use, smoke generated at the heat plate 400 is drawn through the heat plate by way of suction generated in the suction chamber 7020.

The heat plate 400 has a heating surface to grill food. The heat plate 400 has holes or openings to allow air to pass through the plate. Typically, the heat plate 400 takes the form of a grate, as shown, such that food grills directly on the plate.

Smoke generated within the cooker 105 during cooking is sucked into the suction chamber 7020 through the openings of the heat plate 400 by a cross-flow fan, or other air flow generator 600. Air flow 7000 is then directed by the air flow generator 600 to a conduit 650 adjacent the air flow generator. One end of the air conduit 650 is thereby coupled to the suction chamber 7020, and the other end of the air conduit 650 couples to another opening of the inner shell 300 in the food grilling region 7010. It is noted that while a gap 7030 is shown between the air conduit 650 and the suction chamber 7020, no such gap exists in most configurations, and the first end of the air conduit 650 connects directly to the suction chamber 7020.

In some embodiments, particularly in the context of the third configuration discussed above, wherein the lid 200 is removed from the cooker 105 in the grilling configuration, while the air flow generator 600 is generating the air flow 7000 discussed, the air flow element may simultaneously draw smoke and fresh air into the suction chamber 7020. This would typically be by drawing ambient air from around the heat plate 400 into the suction chamber 7020 along with the smoke present.

The fan 600 then directs the air-smoke mixture back into the food grilling region via the air conduit 650 or duct, and upon exiting the air conduit, the air flow 7000 is guided by the lid 200. In some embodiments, and in particular, when in the third configuration, the incorporation of fresh air into the smoke reduces the concentration of volatile compounds in the smoke as well as the visibility of smoke. Thus, a smokeless, or reduced smoke, grilling experience is achieved in the third configuration, even when the cooker 105 is open.

Figure 5:
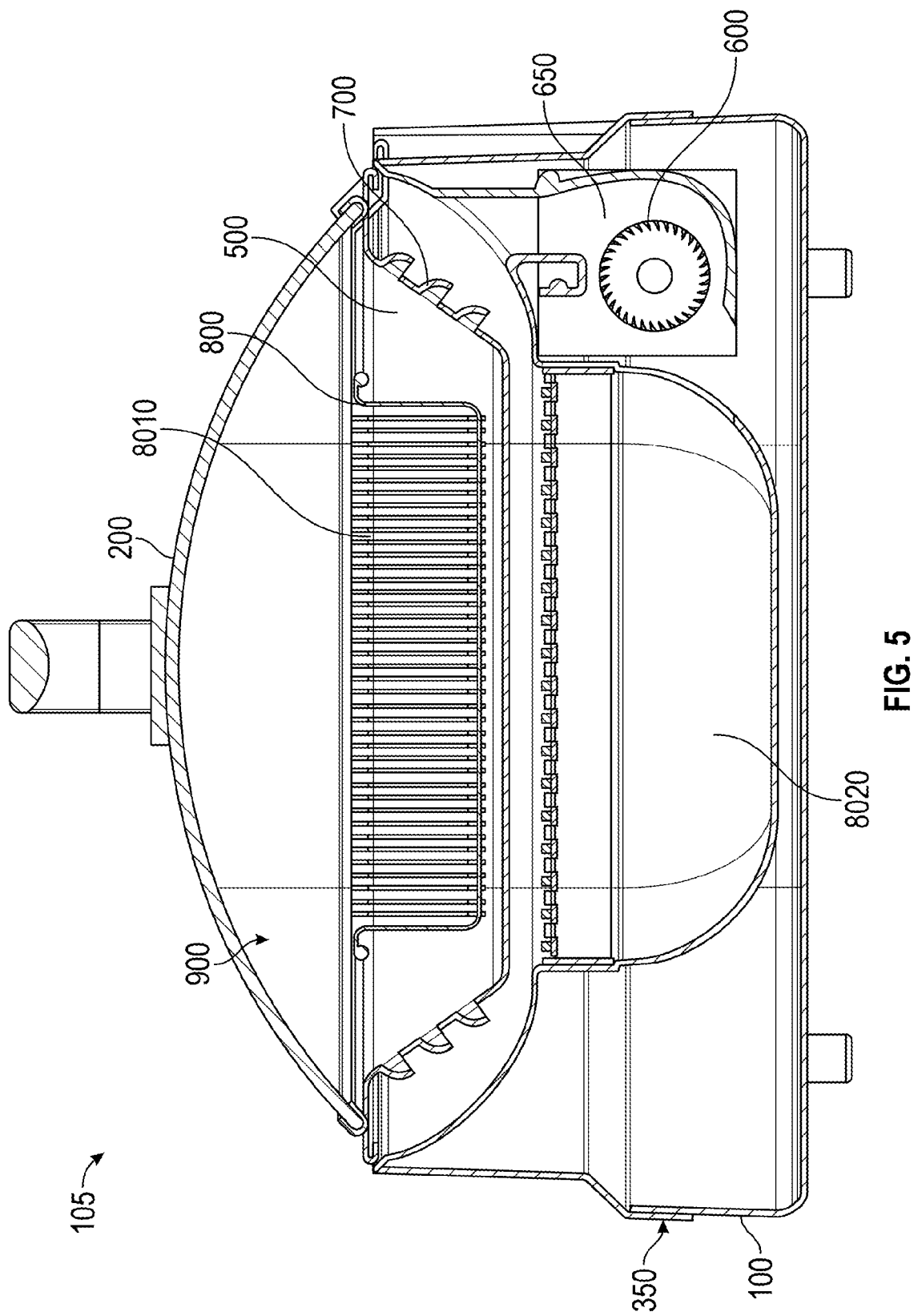
FIG. 5 is a cross-sectional view of a grill and air fryer in the air fry mode according to an embodiment.

FIG. 5 shows the second configuration of the cooker 105 for an air fry mode, and FIG. 8 illustrate the air flow 8000 in such a configuration. The lid 200 and the inner shell 300 form an enclosure, and the air fry insert 500 is located within the inner shell 300 such that it is located at a distance above the heat plate 400. The air fry basket 800 is then inserted within the air fry insert 500, and a food cooking region 8010 is located within the air fry basket 800 and below the lid 200. An air heating region 8020 is then provided in the space between the air fry insert 500 and the inner shell 300, located where the suction chamber 7020 is in the first configuration.

It will be noted that when the air flow generator 600 is active, the air heating region 8020 will be provided with some amount of negative pressure, such that air that has been used for air frying will be drawn into that region for reheating. In the air fry mode, the air passes through the air fry chamber then to the vents 700 on the left side, then to the area between the air fry insert 500 and the heat plate 400, then through the heat plate 400, then to the suction chamber 7020, and then to the air flow generator 600.

The heat plate 400 has a heating surface to heat the air flow 8000 to a desired temperature. The plate 400 has holes or openings to allow air to pass through the plate. In the second configuration, the air flow generator 600 draws the heated air from the air heating region 8020 and directs the air flow 8000 to the food cooking region 8010 via the air conduit 650 or duct. As discussed above with respect to the first configuration, one end of the air conduit 650 is located adjacent the air flow generator 600 at an opening in the inner shell 300 in the air heating region 8020, and the other end of the air conduit 650 is located at an opening in the inner shell 300 adjacent a guided air inlet taking the form of the vents 700 in the air fry insert 500. The air inlet vents 700 in the air fry insert 500 direct at least a portion of the air flow 8000 horizontally through the food cooking region 8010, which thereby functions as an air frying chamber. As such, the vents 700 direct heated air across food positioned in the air fry basket 800.

After passing across the food located in the air fry basket 800, the air flow 8000 continues to a vent 700 functioning as an air outlet in the air fry insert 500 opposite the air inlet vent 700.

The cooker 105 may include a temperature sensor and/or a smoke sensor. One or more circuits/processors may be used to control the activation of the heat plate and fan, as well as the amount of heat generated and the speed of the fan, based on the sensed temperature and/or smoke. Further, such a processor or circuitry may be used to control operation of the cooker 105 in the three distinct configurations described, such that the air flow or oven temperature varies depending on the presence or absence of the air fry insert 500. The temperature sensor and the circuity may be configured to control an amount of heat generated by the heat plate 400 or a speed of air flow generated by the air flow generator 600 based on the temperature of the air in an air heating chamber and/or the temperature of the air in the cooking chamber in the enclosure 200. The amount of heat generated can be adjusted based on the temperature of the heat plate 400 in the grill mode.

Figure 9:
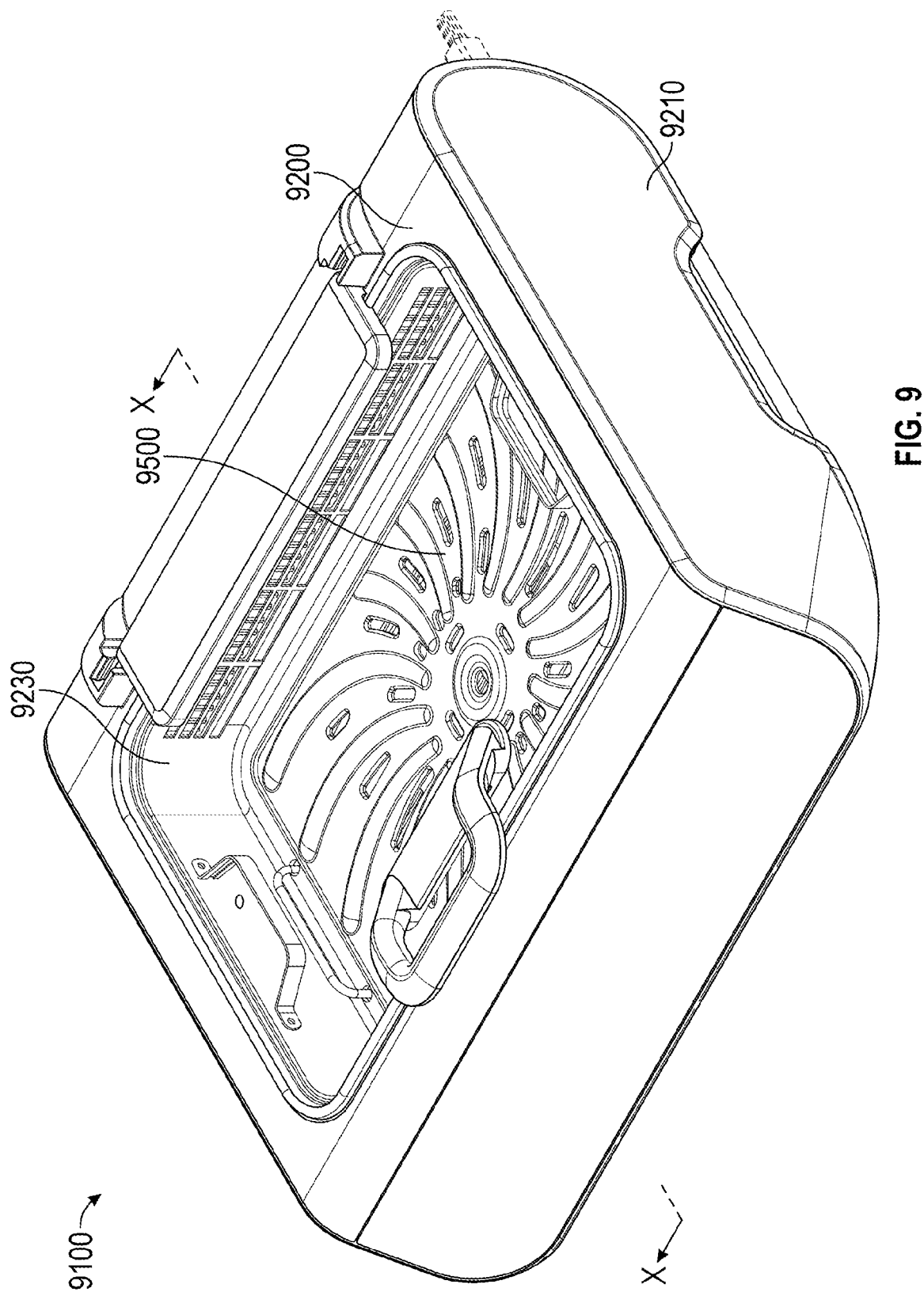
FIG. 9 is a perspective view of a cooker according to an embodiment.
Figure 10:
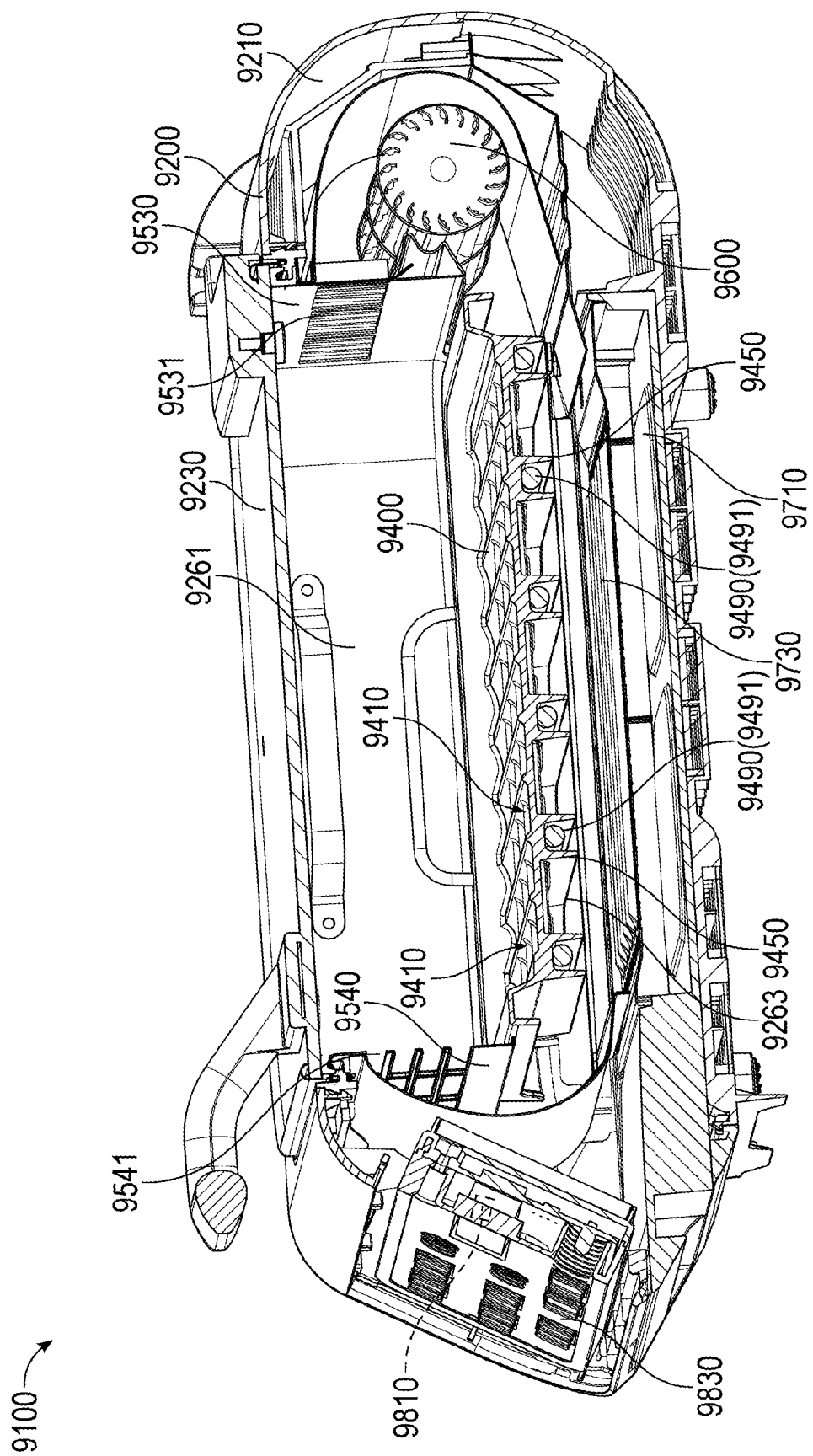
FIG. 10 is a cross-sectional view of a cooker, which is taken along a line X-X in FIG. 9, when operating in a grill mode according to an embodiment.
Figure 11:
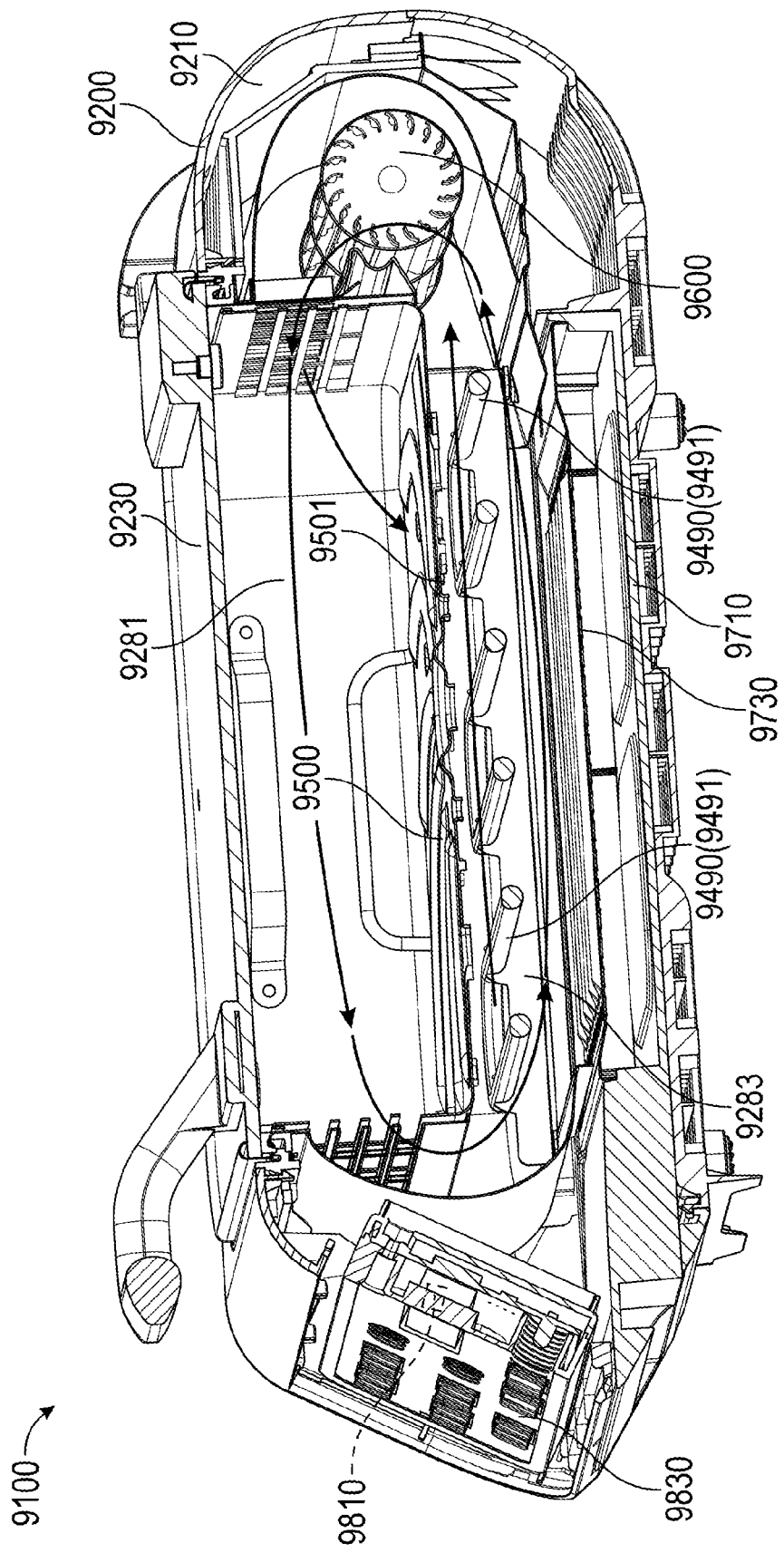
FIG. 11 is a cross-sectional view of a cooker, which is taken along a line X-X in FIG. 9, when operating in an air fry mode according to an embodiment.

FIG. 9 is a perspective view of a cooker according to an embodiment. FIGS. 10 and 11 are cross-sectional views, taken along a line X-X in FIG. 9, of a cooker in a grill mode and an air fry mode respectively according to an embodiment.

The cooker 9100 shown in FIG. 10 includes an enclosure 9200, a grill plate 9400, a heat generator 9490, an air fry basket 9500 (see FIG. 11), and an air flow generator 9600. In the illustrated example, the enclosure 9200 may be heat resistant. The enclosure 9200 includes an outer shell 9210 and a lid 9230. The outer shell 9210 may enclose the grill plate 9400 and the air fry basket 9500, and the air flow generator 9600. The lid 9230 may be disposed at the top of the outer shell 9210. In the example of FIG. 10, the lid 9230 is flat, but may be another shape, such as a dome shape shown in FIG. 1.

Figure 13:
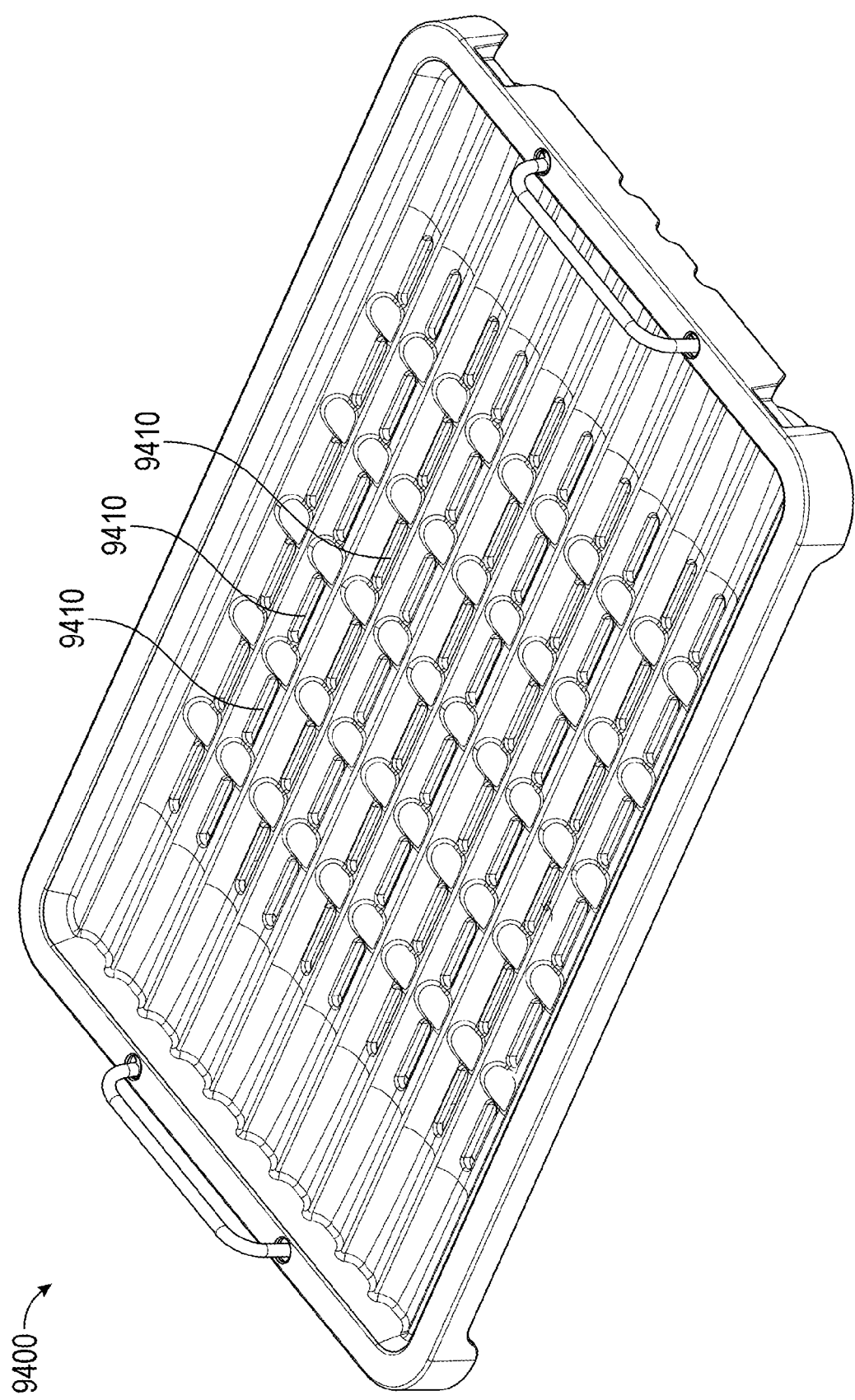
FIG. 13 is a perspective view of a grill plate according to an embodiment.
Figure 14:
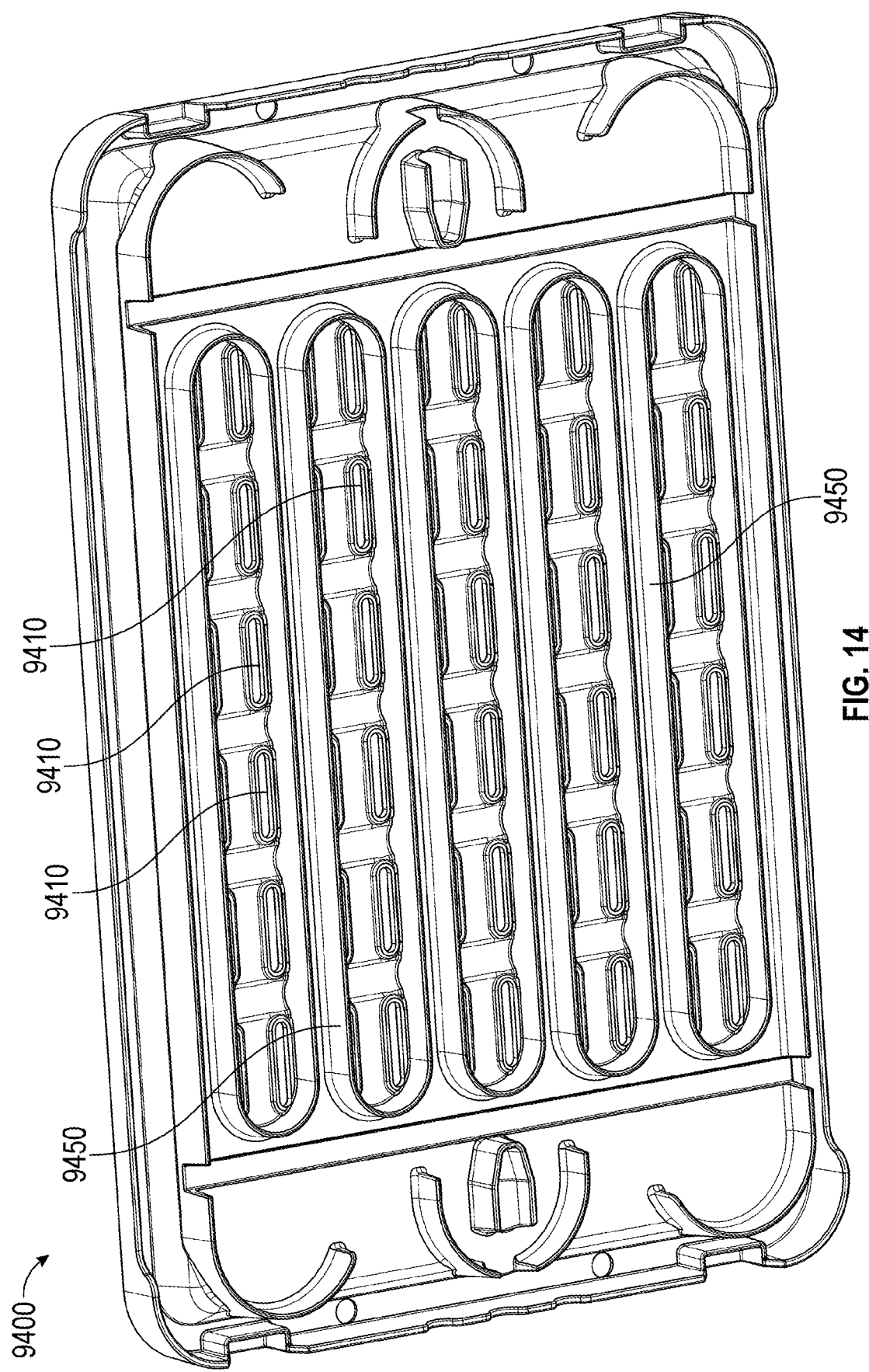
FIG. 14 is a perspective view of a grill plate according to an embodiment.

The cooker 9100 may be utilized in a grill configuration, as shown in FIG. 10, or in an air fry configuration, as shown in FIG. 11. As shown in FIG. 10, the grill plate 9400 is configured to be situated in the enclosure 9200 when the cooker 9100 is in the grill configuration. When the cooker 9100 is in the grill configuration, the enclosure 9200 includes a grilling chamber 9261 above the grill plate 9400 and a suction chamber 9263 below the grill plate 9400. FIGS. 13 and 14 show perspective views of the grill plate 9400. The grill plate 9400 may be provided with one or more openings 9410.

In the illustrated example, the grill plate 9400 is distinct and removable from the heat generator 9490. The distinction of the grill plate 9400 and the heat generator 9490 can result in simpler and cheaper manufacturing of the heat generator 9490 as well as the grill plate 9400. In addition, if the grill plate 9400 is distinct from the heat generator 9490, the heat generator 9490 may be permanently connected to a unit of the cooker 9100 so that there are less issues that come along with removable electrical terminals. In addition, if the grill plate 9400 is distinct from the heat generator 9490, the design of the grill plate 9400 can be easily changed. For example, the design of the grill plate 9400 may be a flat "griddle" plate that is easily manufactured and easily installed on top of the heat generator 9490.

As shown in FIG. 10, the grill plate 9400 is configured to contact with the heat generator 9490. In one embodiment, as shown in FIGS. 13 and 14, the grill plate 9400 may include one or more heat transfer components 9450 that envelope the heat generator 9490. In one embodiment, the grill plate 9400 may include one or more heat transfer components that envelope a temperature sensor so that heat can be transferred more efficiently to the temperature sensor thereby giving more accurate and faster temperature update to circuitry 9810. In one example, the heat generator 9490 includes one or more elongated heat generating elements 9491, which may be parallel to each other, and each of the elongated heat generating elements 9491 is enveloped within one of the heat transfer components 9450. Accordingly, the heat transfer components 9450 may be configured to maximize contact with the heat generating elements 9491.

In one example, as shown in FIG. 10, the cooker 9100 may include a side wall 9530 and a side wall 9540. The side wall 9530 and the side wall 9540 are spaced apart from each other in the horizontal direction, and face to each other. In the illustrated example, the side wall 9530 and the side wall 9540 are fixed to the enclosure 9200. The side wall 9530 may include one or more air vents 9531, and the side wall 9540 may include one or more air vents 9541. In the embodiment shown, airflow parts, such as the side wall 9530 with the air vents 9531 and the side wall 9540 with the air vents 9541, may be fixed to the enclosure 9200. As such, when removing the grill plate 9400 or the air fry basket 9500 discussed below, the airflow parts may remain installed, and are therefore less susceptible to bending/damage during cleaning.

As shown in FIG. 11, the air fry basket 9500 is configured to be situated in the enclosure 9200 when the cooker 9100 is in the air fry configuration. When the cooker 9100 is in the air fry configuration, the enclosure 9200 includes an air frying chamber 9281 in the air fry basket 9500 and an air heating chamber 9283 outside the air fry basket 9500. When the cooker 9100 is in the air fry configuration, the heat generator 9490 may be situated below the air fry basket 9500 and at a distance with the air fry basket 9500.

Figure 12:
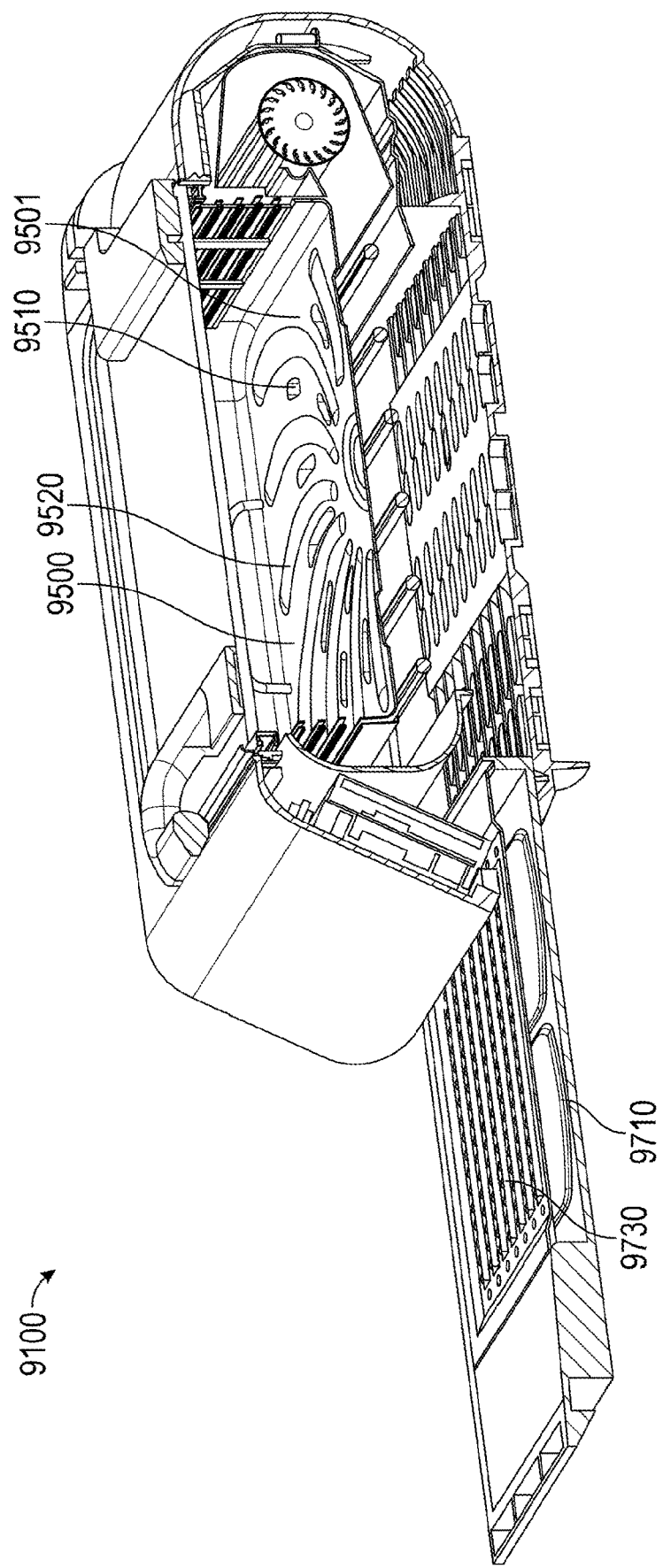
FIG. 12 is a cross-sectional view of a cooker with a drip tray removed according to an embodiment.

In the illustrated example of FIG. 11, the air fry basket 9500 may include an air fry bottom plate 9501. In one example, the air fry bottom plate 9501 includes no opening. In another example, as shown in FIG. 12, the air fry bottom plate 9501 may be mostly closed but is provided one or more openings 9510. In one embodiment, in a plan view, a total area of the one or more openings 9510 of the air fry bottom plate 9501 may be smaller than a total area of the one or more openings 9410 of the grill plate 9400. Some air may flow down through the openings 9510 in the downward direction. The openings 9510 may allow the drippings to quickly drain away from the food.

The air fry basket 9500 may further include an air fry bottom plate 9501 that includes a plurality of ridges 9520. Each of the plurality of ridges 9520 may project upward. The ridges 9520 can prevent most of the food from contacting the bottom surface of air fry bottom plate 9501. The ridges 9520 may then act in concert with the one or more openings 9510 to draw moisture away from food and out of the basket 9500.

Returning to FIG. 10, the air flow generator 9600 may have configurations similar to the air flow generator 600 discussed in view of FIG. 1. The air flow generator 9600 may be configured to generate an air flow within the enclosure 9200. When the cooker 9100 is the grill configuration, as shown in FIG. 10, the air flow generator 9600 may be configured to cause air to flow from the air vents 9531 to the grilling chamber 9261. The air flow generator 9600 may be configured to cause air to flow from the grilling chamber 9261 through the one or more openings 9410 of the grill plate 9400 into the suction chamber 9263, and from the suction chamber 9263 back into the grilling chamber 9261. The air flow generator 9600 may be configured to draw fresh air into the enclosure 9200, and the fresh air may be mixed with smoke. Mixing of the fresh air and the smoke may diffuse the smoke. Some air in the grilling chamber 9261 may be drawn into the suction chamber 9263 via the air vents 9541.

When the cooker 9100 is the air fry configuration, as shown in FIG. 11, air may be heated in the air heating chamber 9283. The air flow generator 9600 may be configured to cause air to flow from the air heating chamber 9283 into the air frying chamber 9281, and from the air frying chamber 9281 back into the air heating chamber 9283. Most or all air in the air frying chamber 9281 may be blown into the air heating chamber 9283 via the air vents 9541.

As shown in FIG. 10, in one embodiment, the cooker 9100 may further include a drip tray 9710 and a drip tray cover 9730. The drip tray 9710 may be below the heat generator 9490, and similarly below the grill plate 9400 in the grill mode and below the air fry basket 9500 in the air fry mode. The drip tray cover 9730 may cover the drip tray 9710. The drip tray cover 9730 may be situated between the drip tray 9710 and the grill plate 9400. The drip tray cover 9730 may be carefully designed with holes and ridges in a specified pattern so that the drippings can quickly drain away from the heating element vicinity, thereby preventing smoking, without interfering with the airflow. In some embodiments, an upper surface of the drip tray cover 9730 is sloped or provided with ridges so as to guide drippings away from the heat generator 9490 and/or toward the holes so that the drippings quickly get far from the heat generator 9490, reducing smoke generation. Optionally, as shown in FIG. 12, the drip tray 9710 and the drip tray cover 9730 may be slidable to be removed from the enclosure 9200 for cleaning.

As shown in FIGS. 10 and 11, the cooker 9100 may further include circuitry 9810, for example, in a user control panel 9830. The circuitry 9810 may be configured to operate the air flow generator 9600 at a first speed when the cooker 9100 is in the grill configuration and operate the air flow generator 9600 at a second speed that is greater than the first speed when the cooker 9100 is in the air fry configuration.

This may provide better smoke extraction while not causing too much of an "air fry" effect on the food when the cooker 9100 is the grill configuration. In another embodiment, the cooker 9100 may operate the air flow generator 9600 at another speed that is smaller than the second speed, for example, when the cooker 9100 is in a bake mode. When the cooker 9100 is in the bake mode, the air flow may be kept lower than the second speed (e.g., as low as possible). The bake mode may be substantially identical to the air fry mode except that the air flow speeds are different. In one embodiment, when the cooker 9100 is in the grill configuration, the user can select whether the air flow generator 9600 is on (e.g., the user can choose a smoke extraction on the user control panel 9830). In one embodiment, the circuitry 9810 may be configured to keep the air flow generator 9600 off when the cooker 9100 is the grill configuration.

According to the present embodiment, the user can change the cooker 9100 from the grill configuration (see FIG. 10) to the air fry configuration (see FIG. 11) by replacing the grill plate 9400 with the air fry basket 9500 that includes the air fry bottom plate 9501. Similarly, the user can change the cooker 9100 from the air fry configuration (see FIG. 11) to the grill configuration (see FIG. 10) by replacing the air fry basket 9500 that includes the air fry bottom plate 9501 with the grill plate 9400. In some embodiments, the cooker 9100 automatically determines which of the grill plate 9400 and the air fry bottom basket 9500 or the air fry bottom plate 9501 are present in the cooker, and may automatically operate in the appropriate mode or otherwise present a user with appropriate options at the user control panel 9830.

The elements and structures in the first embodiment can be incorporated into the cooker of the second embodiment, and vice versa. While the present disclosure has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the disclosure.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A cooker, comprising:
an enclosure;
a grill plate provided with one or more openings;
an air fry basket; and
an air flow generator configured to generate an air flow within the enclosure,
wherein the cooker is configured to have two alternate configurations, such that the cooker has:
a grill configuration in which the grill plate is situated in the enclosure; and
an air fry configuration in which the air fryer basket is situated in the enclosure, the air fry configuration being different from the grill configuration, and
wherein the cooker further comprises a common heat generator configured to:
heat the grill plate, in a state where the heat generator is situated below the grill plate, when the cooker is in the grill configuration; and
heat air in the air flow, in a state where the heat generator is situated below the air fry basket, when the cooker is in the air fry configuration.

2. The cooker of claim 1,
wherein when the cooker is in the grill configuration:
the enclosure includes a grilling chamber above the grill plate and a suction chamber below the grill plate, and
the air flow generator is configured to cause air to flow from the grilling chamber into the suction chamber, and from the suction chamber back into the grilling chamber, and
wherein when the cooker is in the air fry configuration:
the enclosure includes an air frying chamber in the air fry basket and an air heating chamber below the air fry basket, the heat generator being situated in the air heating chamber, and being configured to heat air in the air heating chamber; and
the air flow generator is configured to cause air heated in the air heating chamber below the air fryer basket, to flow from the air heating chamber into the air frying chamber, and to cause air to flow from the air frying chamber back into the air heating chamber.

3. The cooker of claim 1, wherein the heat generator is configured to:
heat the grill plate, in a state where the heat generator contacts with the grill plate, when the cooker is in the grill configuration, and
heat the air in the air flow, in a state where the heat generator is situated below the air fry basket and is at a distance with the air fry basket, when the cooker is in the air fry configuration.

4. The cooker of claim 3, wherein the grill plate includes one or more heat transfer components that envelope the heat generator.

5. The cooker of claim 4, wherein the heat generator includes one or more elongated heat generating elements, each of the elongated heat generating elements being enveloped within one of the heat transfer components.

6. The cooker of claim 1, wherein the air fry basket includes an air fry bottom plate that includes no opening.

7. The cooker of claim 1, wherein the air fry basket includes an air fry bottom plate that is provided one or more openings, and
wherein a total area of the one or more openings of the air fry bottom plate is smaller than a total area of the one or more openings of the grill plate.

8. The cooker of claim 1, wherein the air fry basket includes an air fry bottom plate that includes a plurality of ridges, each of the plurality of ridges projecting upward.

9. The cooker of claim 1, wherein the air flow generator is configured to flow air:
at a first speed when the cooker is in the grill configuration; and
at a second speed that is greater than the first speed when the cooker is in the air fry configuration.

10. The cooker of claim 1, wherein an amount of heat generated by the heat generator or a speed of air flow generated by the air flow generator is controlled based on an amount of smoke detected.

11. The cooker of claim 1, further comprising:
a drip tray below the grill plate; and
a drip tray cover covering the drip tray.

12. The cooker of claim 1, wherein the air flow generator is further configured to draw fresh air into the enclosure.

13. The cooker of claim 1, wherein the enclosure is heat resistant.

14. The cooker of claim 1, further comprising one or more air vents in the enclosure,
wherein when the cooker is in the air fry configuration, the air flow generator directs air flow horizontally across a segment of the air fry basket.

15. The cooker of claim 1, wherein the enclosure includes an upper shell and a lower shell,
wherein the grill plate is a heat plate configured to be situated between the upper and lower shells, the heat plate including one or more contact surfaces, and
wherein the air fry basket includes an insert configured to be situated at a distance above the heat plate, the insert including one or more air flow guiding vents.

16. The cooker of claim 15, wherein the upper and lower shells are hingedly connected.

17. The cooker of claim 15, further comprising a temperature sensor and circuitry configured to control an amount of heat generated by the heat plate or a speed of air flow generated by the air flow generator based on the temperature of the air in an air heating chamber in the enclosure.

18. The cooker of claim 15, further comprising:
a base outer shell configured to enclose the lower shell and the air flow generator; and
a basket for holding food to be air fried in the insert, wherein the upper shell is dome-shaped.

19. The cooker of claim 1, wherein the air fryer basket includes a bottom and a side extending upwardly from the bottom, the side being provided with one or more openings, and
wherein air heated by the heat generator passes through the one or more openings of the side of the air fryer basket from an outside the air fryer basket to an inside the air fryer basket, when the cooker is in the air fry configuration.

20. The cooker of claim 1, wherein, when the cooker is in the air fry configuration, the one or more openings of the side of the air fryer basket are configured to be disposed at a location higher than a location at which the grill plate is disposed when the cooker is in the grill configuration.

* * * * *